(12) United States Patent
Sun et al.

(10) Patent No.: US 9,383,085 B2
(45) Date of Patent: Jul. 5, 2016

(54) LIGHT BAR AND LIGHT EMITTING MODULE USING THE SAME

(71) Applicants: AU Optronics (Suzhou) Corp., Ltd., Suzhou (CN); AU Optronics Corporation, Hsin-Chu (TW)

(72) Inventors: Ren-Yi Sun, Suzhou (CN); Liang Fang, Suzhou (CN)

(73) Assignees: AU OPTRONICS (SUZHOU) CORP., LTD., Suzhou (CN); AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 13/798,814

(22) Filed: Mar. 13, 2013

(65) Prior Publication Data

US 2014/0022791 A1    Jan. 23, 2014

(30) Foreign Application Priority Data

Jul. 23, 2012  (CN) .......................... 2012 1 0255458

(51) Int. Cl.
| | |
|---|---|
| *F21S 4/00* | (2016.01) |
| *F21V 19/00* | (2006.01) |
| *G02F 1/1335* | (2006.01) |

(52) U.S. Cl.
CPC .............. *F21V 19/0035* (2013.01); *F21S 4/28* (2016.01); *G02F 1/133603* (2013.01); *G02F 2001/133612* (2013.01)

(58) Field of Classification Search
CPC ............ F21S 2/00; F21S 4/008; F21V 19/00; F21V 23/00; F21V 23/06; F21V 19/0035; F21Y 101/02; H05K 1/00; H05K 1/0274; H05K 1/111; H05K 1/115; H05K 1/117; G02F 2001/133612; G02F 1/133603
USPC .............. 362/249.02, 249.01, 551, 581, 582, 362/217, 383, 430, 800, 630, 631, 97.3
See application file for complete search history.

(56) References Cited

U.S. PATENT DOCUMENTS

| | | | |
|---|---|---|---|
| 4,955,824 A * | 9/1990 | Pretchel et al. | 439/510 |
| 6,659,622 B2 * | 12/2003 | Katogi et al. | 362/219 |
| 6,851,831 B2 * | 2/2005 | Karlicek, Jr. | 362/249.06 |
| 8,197,079 B2 * | 6/2012 | Ruud et al. | 362/85 |
| 2010/0073931 A1 * | 3/2010 | Watanabe | 362/249.02 |
| 2011/0310590 A1 * | 12/2011 | Yamashita et al. | 362/97.1 |

FOREIGN PATENT DOCUMENTS

CN     201715371 U     1/2011

* cited by examiner

*Primary Examiner* — Jason Moon Han
*Assistant Examiner* — Omar Rojas Cadima
(74) *Attorney, Agent, or Firm* — WPAT, PC; Justin King; Douglas A. Hosack

(57) ABSTRACT

A light bar is disclosed which includes a substrate, plural LEDs disposed on the substrate, a first connector and a second connector disposed on opposite sides of the substrate, a first wire, a second wire, a third wire, and a fourth wire. The first connector sequentially includes a first pin, a second pin, a third pin, and a fourth pin. The second connector sequential includes a fifth pin, a sixth pin, a seventh pin, and an eighth pin. The first wire connects the first pin to the second pin. The second wire connects the third pin to the fifth pin. The third wire connects the sixth pin to the seventh pin. The fourth wire connects the fourth pin to the eighth pin. A light emitting module using the light bar is also disclosed.

14 Claims, 7 Drawing Sheets

LIGHT BAR AND LIGHT EMITTING MODULE USING THE SAME

RELATED APPLICATIONS

This application claims priority to China Application Serial Number 201210255458.2, filed Jul. 23, 2012, which is herein incorporated by reference.

BACKGROUND

1. Field of Invention

The present invention relates to a light bar. More particularly, the present invention relates to a light bar utilized in a direct backlight module.

2. Description of Related Art

A liquid crystal display includes the main elements of a backlight module, a display panel, and a frame. The backlight module is utilized for providing a light source to enable the display panel to display a normal and uniform image. The backlight module includes plural optical sheets, such as a light guide plate, a diffusion sheet, and a prism sheet for uniformly distributing the light emitted from the light source on the display panel to provide images. The frame includes a bezel and a mold frame for fastening the display panel and the backlight module. The backlight module can be a direct backlight, in which the light source is disposed behind the screen, or an edge backlight module, in which the light source is disposed at the edge of the screen.

With the ever-increasing size of displays, the size of light bars utilized in direct backlight modules is also becoming larger and larger. In order to simplify fabrication, transport, and assembly, several light bars are assembled to obtain a predetermined size. However, the light bars are frequently designed having different layouts, thereby increasing the cost of managing the light bars and making assembly difficult.

SUMMARY

The invention provides a light emitting module made by connecting plural light bars with substantially the same layout to reduce management costs and make assembly easier.

An aspect of the invention provides a light bar which includes a substrate; a plurality of light emitting diodes disposed on the substrate; a first connector disposed at an end of the substrate and sequentially including a first pin, a second pin, a third pin, and a fourth pin; a second connector disposed at another end of the substrate opposite to the first connector and sequentially including a fifth pin, a sixth pin, a seventh pin, and an eighth pin; a first wire connecting the first pin to the second pin; a second wire connecting the third pin to the fifth pin; a third wire connecting the sixth pin to the seventh pin and serially connecting the light emitting diodes; and a fourth wire connecting the fourth pin to the eighth pin.

The first wire and the third wire can be U-shaped, and the fourth wire can be linearly arranged. The second wire can be step-shaped and partly surrounds the light emitting diodes. The light emitting diodes can be serially connected from the sixth pin to the seventh pin. The light emitting diodes can be serially connected from the seventh pin to the sixth pin.

Another aspect of the invention provides a light emitting module which includes a plurality of the light bars. The second connector of each of the light bars is connected to the first connector of the adjacent light bar. The light emitting module further includes an adopting board, and a third connector disposed on the adopting board, in which the third connector is connected to the second connector of the light bar adjacent to the adopting board. The third connector sequentially includes a ninth pin, a tenth pin, an eleventh pin, and a twelfth pin. The light emitting module further includes a fifth wire for connecting the ninth pin to the tenth pin. The light emitting module further includes a power source, and the eleventh pin or the twelfth pin is connected to the power source. The light emitting module further includes a driving chip, in which the twelfth pin or the eleventh pin is connected to the driving chip. The light emitting module further includes a conductive element for electrically interconnecting the third pin and the fourth pin of the first connector of the light bar farthest from the adopting board. The conductive element can be a jumper, a pad, a wire, or a connector.

Users may flexibly assemble the light bars with substantially the same layout in rows, and the light bars in such rows can be further interconnected to thereby provide the light emitting module with a predetermined size. The light bars utilized in the light emitting module have substantially the same layout. Therefore, the cost of managing the light bars can be reduced, and assembly can be performed more easily. It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
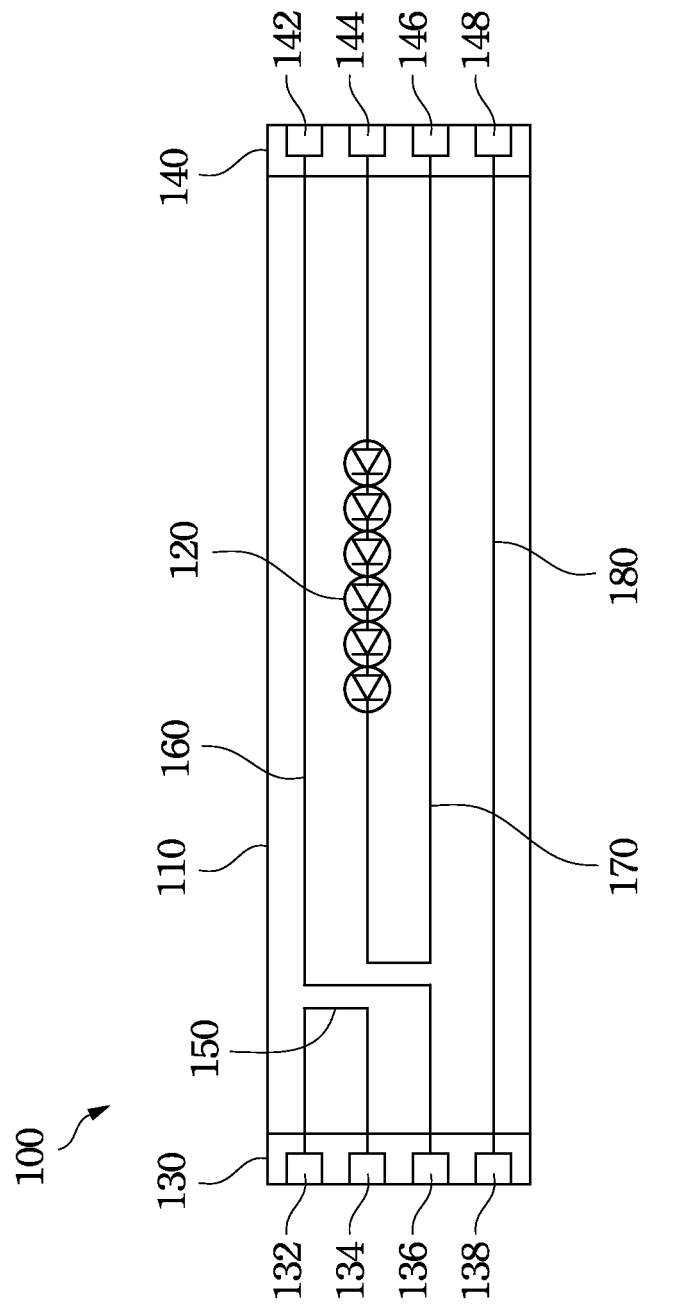
FIG. 1 is a schematic diagram of an embodiment of a light bar of the invention.

Reference will now be made in detail to the present embodiments of the invention, examples of which are illustrated in the accompanying drawings. Wherever possible, the same reference numbers are used in the drawings and the description to refer to the same or like parts.

Light bars with different layouts increase management costs. Therefore, the present invention redesigns the layout of the light bar, and light bars with substantially the same layout can be assembled as a light emitting module. As a result of the light bars of the light emitting module having substantially the same layout, management of the light bars is made easier.

FIG. 1 is a schematic diagram of an embodiment of a light bar of the invention. A light bar 100 includes a substrate 110, a plurality of light emitting diodes 120 disposed on the substrate 110, a first connector 130, and a second connector 140. The first connector 130 is disposed at an end of the substrate 110, and the second connector 140 is disposed at another end of the substrate 110 and is opposite to the first connector 130. In this embodiment, the first connector 130 and the second connector are disposed at two opposite ends of a long axis of the substrate 110. In other embodiments, the first connector 130 and the second connector can be disposed at two opposite ends of a long axis of the substrate 110. The light emitting diodes 120 are disposed between the first connector 130 and the second connector 140.

The first connector 130 and the second connector 140 are 4-pin connectors. The first connector 130 sequentially includes a first pin 132, a second pin 134, a third pin 136, and a fourth pin 138. The second connector 140 sequentially includes a fifth pin 142, a sixth pin 144, a seventh pin 146, and an eighth pin 148. The first pin 132 corresponds to the fifth pin 142, i.e., corresponds in position horizontally (in the drawing) from the fifth pin 142. The second pin 134 corresponds to the sixth pin 144. The third pin 136 corresponds to the seventh pin 146. The fourth pin 138 corresponds to the eighth pin 148.

The light bar 100 further includes a first wire 150, a second wire 160, a third wire 170, and a fourth wire 180. The first wire 150 connects the first pin 132 to the second pin 134. The second wire 160 connects the third pin 136 to the fifth pin 142. The third wire 170 connects the sixth pin 144 to the seventh pin 146 and serially connects the light emitting diodes 120. The fourth wire 180 connects the fourth pin 138 to the eighth pin 148.

The first wire 150 is U-shaped. Two ends of the first wire 150 are respectively connected to the first pin 132 and the second pin 134. The second wire 160 is step-shaped. Two opposite ends of the second wire 160 are respectively connected to the third pin 136 and the fifth pin 142. The light emitting diodes 120 are disposed on the substrate 110 in series. The step-shaped configuration of the second wire 160 is such that the second wire 160 partly surrounds the light emitting diodes 120. The third wire 170 is U-shaped. Two opposite ends of the third wire 170 are respectively connected to the sixth pin 144 and the seventh pin 146. The fourth wire 180 is linear. Two opposite ends of the fourth wire 180 are respectively connected to the fourth pin 138 and the eighth pin 148.

Figure 2:
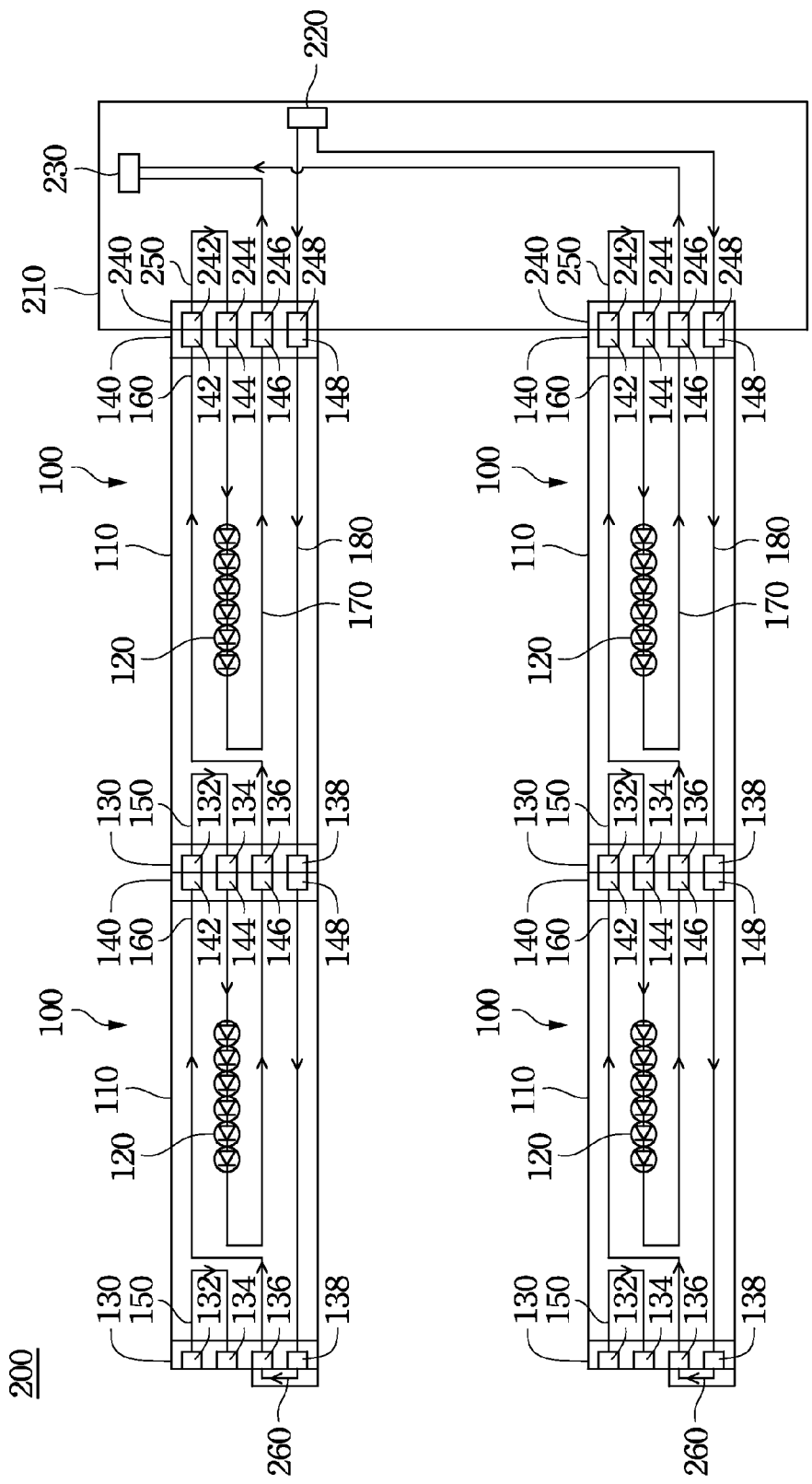
FIG. 2 is a schematic diagram of a first embodiment of a light emitting module of the invention.

FIG. 2 is a schematic diagram of a first embodiment of a light emitting module of the invention. Plural light bars 100 can be horizontally connected to each other in series through the first connector(s) 130 and the second connector(s) 140, thereby forming a light emitting module 200. In this embodiment, the light emitting module 200 is formed by assembling two light bars 100 in a single row. In some embodiments, two or more light bars 100 are assembled together to form a light bar row, and a plurality of light bar rows form the light emitting module 200. For example, two light bar rows may form the light emitting module 200, as shown in FIG. 2.

The two light bars 100 of this embodiment are connected to each other by the first connector 130 of one light bar 100 and the second connector 140 of the other light bar 100. For convenience, said "one" light bar 100 will be referred to hereinafter as the "right" light bar 100, and said "other" light bar 100 will be referred to hereinafter as the "left" light bar 100, using the positional relationship of the two light bars 100 as shown in FIG. 2. More particularly, the second connector 140 of the left light bar 100 is connected to the first connector 130 of the right light bar 100. When the first connector 130 of the right light bar 100 is connected to the second connector 140 of the left light bar 100, the first pin 132 of the first connector 130 is connected to the fifth pin 142 of the second connector 140, the second pin 134 of the first connector 130 is connected to the sixth pin 144 of the second connector 140, the third pin 136 of the first connector 130 is connected to the seventh pin 146 of the second connector 140, and the fourth pin 138 of the first connector 130 is connected to the eighth pin 148 of the second connector 140.

The light emitting module 200 further includes an adopting board 210, and a power source 220 and a driving chip 230 disposed on the adopting board 210. The light emitting module 200 further includes a third connector 240 disposed on the adopting board 210. The third connector 240 is connected to the second connector 140 of the right light bar 100. The second connector 140 of the right light bar 100 may be referred to herein as the "edge" second connector 140, since this second connector 140 is disposed at an end of the horizontally connected light bars 100. The third connector 240 sequentially includes a ninth pin 242, a tenth pin 244, an eleventh pin 246, and a twelfth pin 248. When the edge second connector 140 is connected to the third connector 240, the fifth pin 142 of the second connector 140 is connected to the ninth pin 242 of the third connector 240, the sixth pin 144 of the second connector 140 is connected to the tenth pin 244 of the third connector 240, the seventh pin 146 of the second connector 140 is connected to the eleventh pin 246 of the third connector 240, and the eighth pin 148 of the second connector 140 is connected to the twelfth pin 248 of the third connector 240.

The light emitting module 200 further includes a fifth wire 250. The fifth wire 250 is disposed on the adopting board 210 for connecting the ninth pin 242 to the tenth pin 244. The fifth wire 250 is U-shaped. Two opposite ends of the fifth wire 250 are respectively connected to the ninth pin 242 and the tenth pin 244. The eleventh pin 246 is connected to the driving chip 230. The twelfth pin 248 is connected to the power source 220. The light emitting diodes 120 are serially connected from the sixth pin 144 to the seventh pin 146 of each of the second connectors 140.

The light emitting module 200 further includes a conductive element 260 for the third pin 136 and the fourth pin 138 of the first connector 130 of the left light bar 100. The first connector 130 of the left light bar 100 may be referred to as the "edge" first connector 130, since this first connector 130 is disposed at an end of the horizontally connected light bars 100. The conductive element 260 can be a wire as illustrated in this embodiment. In other embodiments, the conductive element 260 can be a jumper, a pad, or a connector.

In this embodiment, as described above, the light emitting module 200 includes two light bars 100. A current provided by the power source 220 is sent to the twelfth pin 248 of the third connector 240, and the current is further sent to the eighth pin 148 of the second connector 140 of the right light bar 100 through the connection of the eighth pin 148 of the second connector 140 of the right light bar 100 to the twelfth pin 248 of the third connector 240. The current is sent from the eighth pin 148 of the right light bar 100 to the fourth pin 138 of the first connector 130 of the right light bar 100 via the corresponding fourth wire 180. The current is then sent from the fourth pin 138 of the right light bar 100 to the eighth pin 148 of the left light bar 100. The current is further sent from the eighth pin 148 of the left light bar 100 to the fourth pin 138 of the left light bar 100 via the corresponding fourth wire 180. The current is further sent from the fourth pin 138 of the left light bar 100 to the third pin 138 of the left light bar 100 via the conductive element 260. The current is then sent from the third pin 136 of the left light bar 100 to the fifth pin 142 of the left light bar 100 via the corresponding second wire 160. Subsequently, the current is sent from the fifth pin 142 of the left light bar 100 to the first pin 132 of the right light bar 100. The current is then sent from the first pin 132 of the right light bar 100 to the second pin 134 of the right light bar 100 via the corresponding first wire 150. The current is then sent from the second pin 134 of the right light bar 100 to the sixth pin 144 of the left light bar 100 through the connection of this second pin 134 to this sixth pin 144. The current is then sent from the sixth pin 144 of the left light bar 100 and passes through the serially connected light emitting diodes 120, and the current is then sent to the seventh pin 146 of the left light bar 100. Subsequently, the current is sent from the seventh pin 146 of the left light bar 100 to the third pin 136 of the right light bar 100 through the connection of this seventh pin 146 to this third pin 136. The current is further sent from the third pin 136 of the right light bar 100 to the fifth pin 142 of the right light bar 100 via the second wire 160. The current is then sent from the fifth pin 142 of the right light bar 100 to the ninth pin 242 of the third connector 240 through the connection between the ninth pin 242 of the third connector 240 and the fifth pin 142 of the right light bar 100. The current is further sent from the ninth pin 242 of the third connector 240 to the tenth pin 244 of the third connector 240 via the fifth wire 250 on the adopting board 210. The current is then sent from the tenth pin 244 of the third connector 240 to the sixth pin 144 of the right light bar 100 through the connection between the tenth pin 244 of the third connector 240 and the sixth pin 144 of the right light bar 100. Next, the current is sent from the sixth pin 144 of the right light bar 100 and is passed through the light emitting diodes 120, and the current is sent to the seventh pin 146 of the right light bar 100. Finally, the current is sent from the seventh pin 146 of the right light bar 100 to the tenth pin 246 of the third connector 240 through the connection between the seventh pin 146 of the right light bar 100 and the tenth pin 246 of the third connector 240, and enters the driving chip 230.

In order to prevent the first pin 132 and the second pin 134 of the edge first connector 130 of the left light bar 100 from interfering with other peripheral components, the first pin 132 can be optionally shorted with the second pin 134. For example, the first pin 132 and the second pin 134 of the edge first connector 130 can be connected by a pad or a wire. The driving chip 230 is a 4-pin chip. The driving chip 230 has four pins for connection. Namely, the driving chip 230 can control four rows of light bars 100. With such a design, the light bars 100 have substantially the same layout, and the light bars 100 can be serially connected in a row to form the light emitting module 200. The cost of managing the light bars 100 can be reduced, and the assembly efficiency thereof can be increased.

Figure 3:
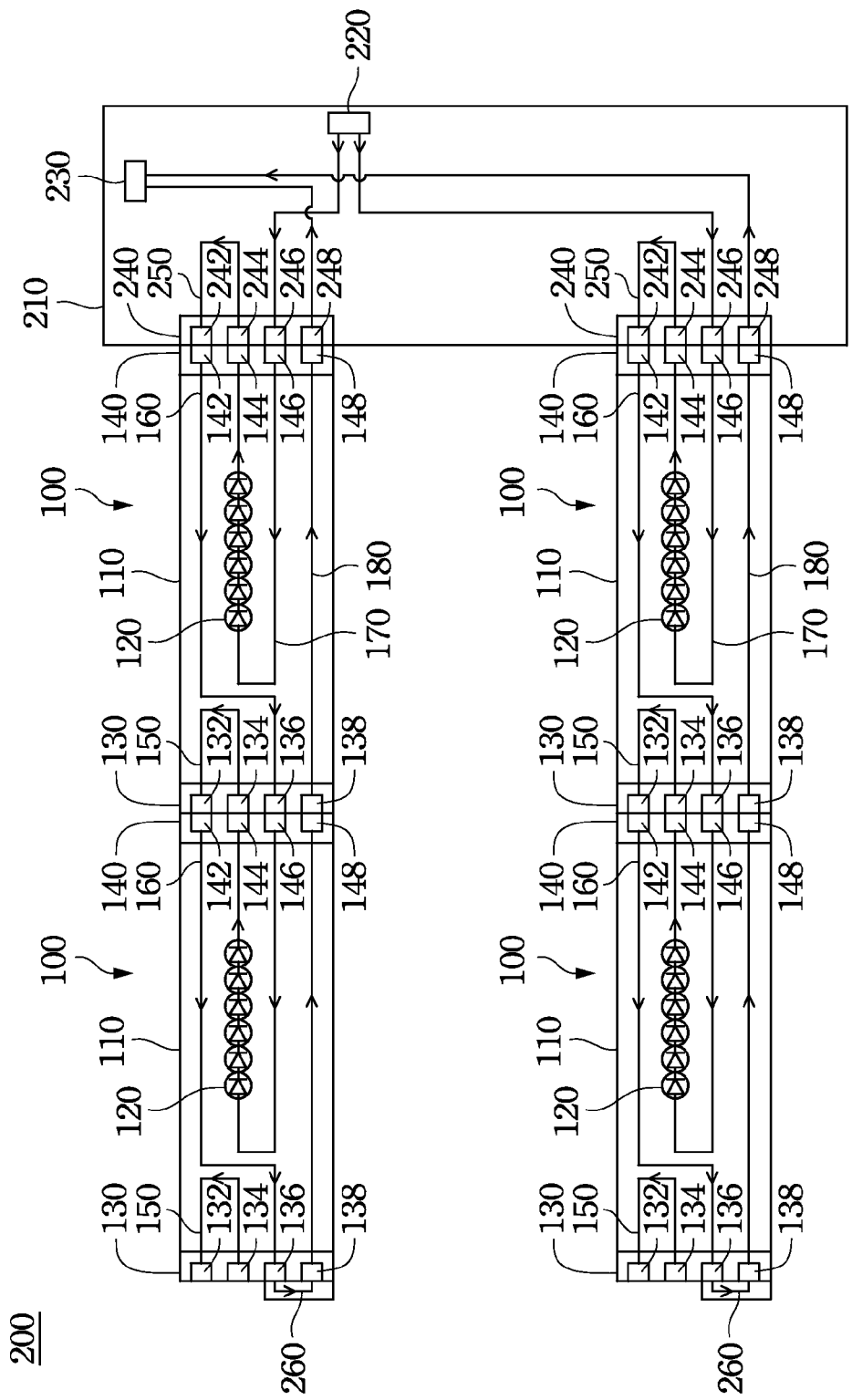
FIG. 3 is a schematic diagram of a second embodiment of the light emitting module of the invention.

FIG. 3 is a schematic diagram of a second embodiment of the light emitting module of the invention. In this embodiment, two of the light bars 100 are coupled to each other. The difference between this embodiment and the first embodiment is that the eleventh pin 246 of the third connector 240 in this embodiment is connected to the power source 220, and the twelfth pin 248 of the third connector 240 is connected to the driving chip 230. The light emitting diodes 120 are serially connected from the seventh pin 146 to the sixth pin 144 of each of the light bars 100. The current direction in this embodiment is opposite to the current direction of the first embodiment. The current path is shown by the arrows in FIG. 3.

Figure 4:
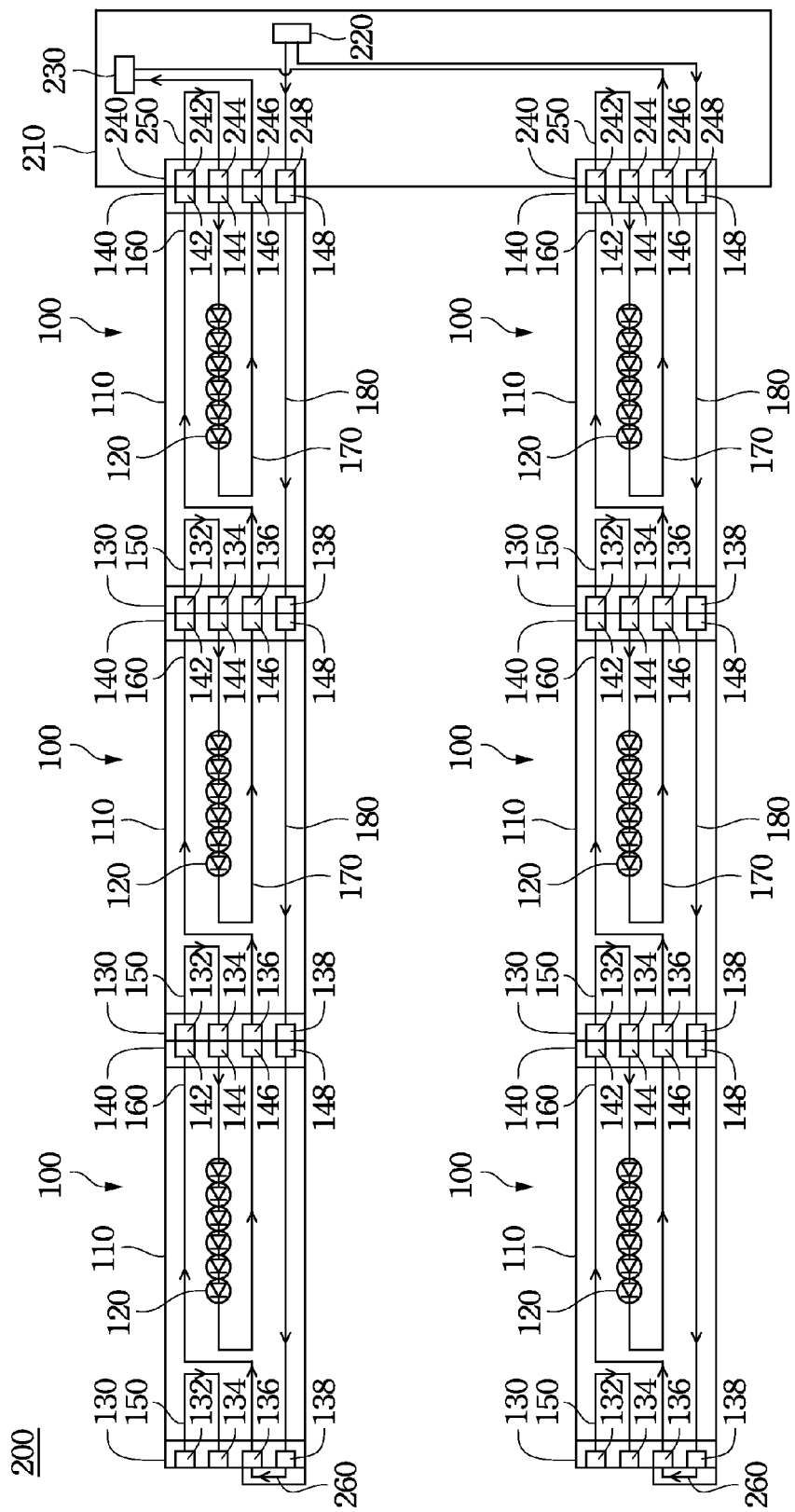
FIG. 4 is a schematic diagram of a third embodiment of the light emitting module of the invention.

FIG. 4 is a schematic diagram of a third embodiment of the light emitting module of the invention. More than two light bars 100 can be connected to each other in a row through the method disclosed previously. The second connector 140 of each of the light bars 100 (except for that of the rightmost light bar 100) is connected to the first connector 130 of the adjacent light bar 100. The edge second connector 140 (i.e., the second connector 140 of the rightmost light bar 100) is connected to the third connector 240. The fifth wire 250 of the adopting board 210 connects the ninth pin 242 of the third connector 240 to the tenth pin 244 of the third connector 240. The third pin 136 and the fourth pin 138 of the edge first connector 130 (i.e., the first connector 130 of the leftmost light bar 100) are connected to each other via the conductive element 260. The eleventh pin 246 of the third connector 240 is connected to the driving chip 230. The twelfth pin 248 of the third connector 240 is connected to the power source 220. The light emitting diodes 120 are serially connected from the sixth pin 144 to the seventh pin 146 of each of the light bars 100. The current path is shown by the arrows in FIG. 4.

Figure 5:
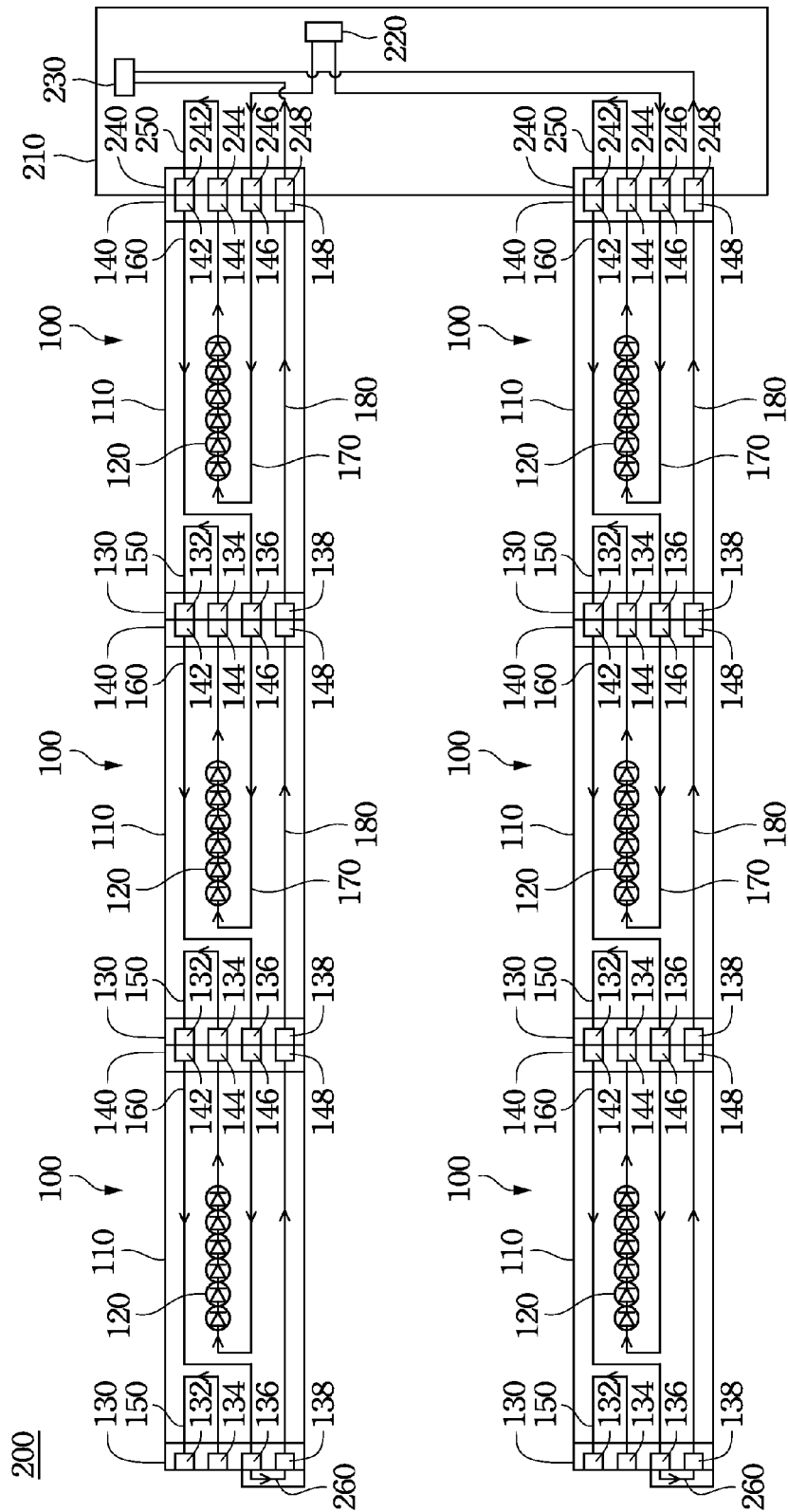
FIG. 5 is a schematic diagram of a fourth embodiment of the light emitting module of the invention.

FIG. 5 is a schematic diagram of a fourth embodiment of the light emitting module of the invention. More than two light bars 100 can be connected to each other in a row through the method disclosed previously. The second connector 140 of each of the light bars 100 (except for that of the rightmost light bar 100) is connected to the first connector 130 of the adjacent light bar 100. The edge second connector 140 (i.e., the second connector 140 of the rightmost light bar 100) is connected to the third connector 240. The fifth wire 250 of the adopting board 210 connects the ninth pin 242 of the third connector 240 to the tenth pin 244 of the third connector 240. The third pin 136 and the fourth pin 138 of the edge first connector 130 (i.e., the first connector 130 of the leftmost light bar 100) are connected to each other via the conductive element 260. The eleventh pin 246 of the third connector 240 is connected to the power source 220. The twelfth pin 248 of the third connector 240 is connected to the driving chip 230. The light emitting diodes 120 are serially connected from the seventh pin 146 to the sixth pin 144 of each of the light bars 100. The current path is shown by the arrows in FIG. 5.

Figure 6:
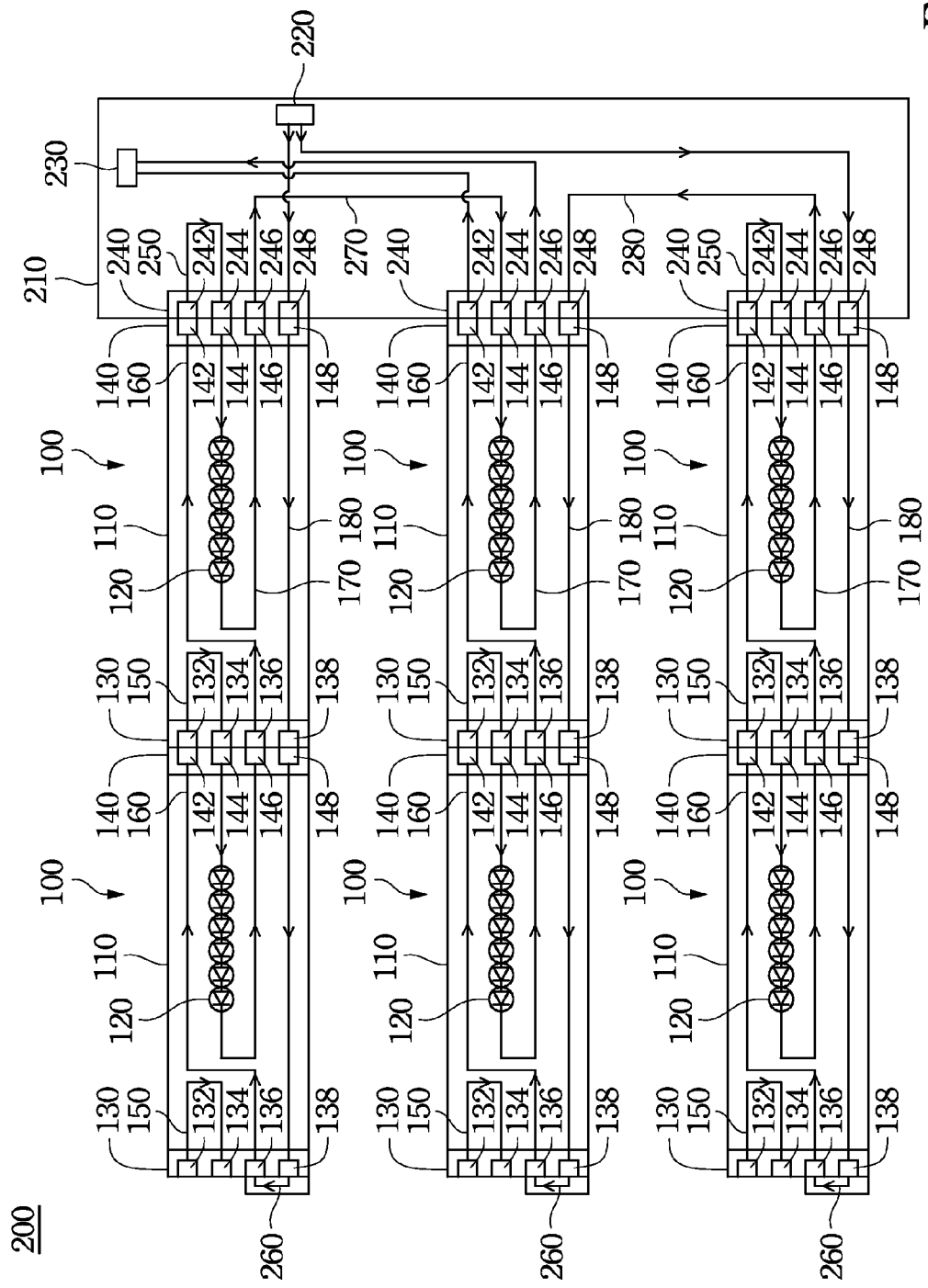
FIG. 6 is a schematic diagram of a fifth embodiment of the light emitting module of the invention.

FIG. 6 is a schematic diagram of a fifth embodiment of the light emitting module of the invention. The light bars 100 connected in rows can be further interconnected by changing the layout of the adopting board 210. In this embodiment, there are three rows of the light bars 100, in which the rows of the light bars 100 are referred to as a first row, a second row, and a third row from top to bottom.

More than two light bars 100 can be connected to each other in a row through the method disclosed previously. The second connector 140 of each of the light bars 100 (except for that of the rightmost light bar 100) is connected to the first connector 130 of the adjacent light bar 100. The edge second connector 140 (i.e., the second connector 140 of the rightmost light bar 100) is connected to the third connector 240. The fifth wire 250 of the adopting board 210 connects the ninth pin 242 of the third connector 240 to the tenth pin 244 of the third connector 240. The third pin 136 and the fourth pin 138 of the edge first connector 130 (i.e., the first connector 130 of the leftmost light bar 100) are connected to each other via the conductive element 260.

The adopting board 210 has two of the fifth wires 250, namely, the fifth wire 250 for connecting the ninth pin 242 and the tenth pin 244 of the third connector 240 connected to the first row of the light bars 100, and the fifth wire 250 for connecting the ninth pin 242 and the tenth pin 244 of the third connector 240 connected to the third row of the light bars 100.

The adopting board 210 further includes a sixth wire 270. The sixth wire 270 is U-shaped. An end of the sixth wire 270 is connected to the eleventh pin 246 of the third connector 240 connected to the first row of the light bars 100, and another end of the sixth wire 270 is connected to the tenth pin 244 of the third connector 240 connected to the second row of the light bars 100.

The adopting board 210 further includes a seventh wire 280. The seventh wire 280 is U-shaped. An end of the seventh wire 280 is connected to the twelfth pin 248 of the third connector 240 connected to the second row of the light bars 100, and another end of the seventh wire 280 is connected to the eleventh pin 246 of the third connector 240 connected to the third row of the light bars 100.

The twelfth pin 248 of the third connector 240 connected to the first row of the light bars 100 is connected to the power source 220. The ninth pin 242 and the eleventh pin 246 of the third connector 240 connected to the second row of the light bars 100 are connected to the driving chip 230. The twelfth pin 248 of the third connector 240 connected to the first row of the light bars 100 is connected to the power source 220. The light emitting diodes 120 are serially connected from the sixth pin 144 to the seventh pin 146 of each of the light bars 100. The current path is shown by the arrows in FIG. 6.

Figure 7:
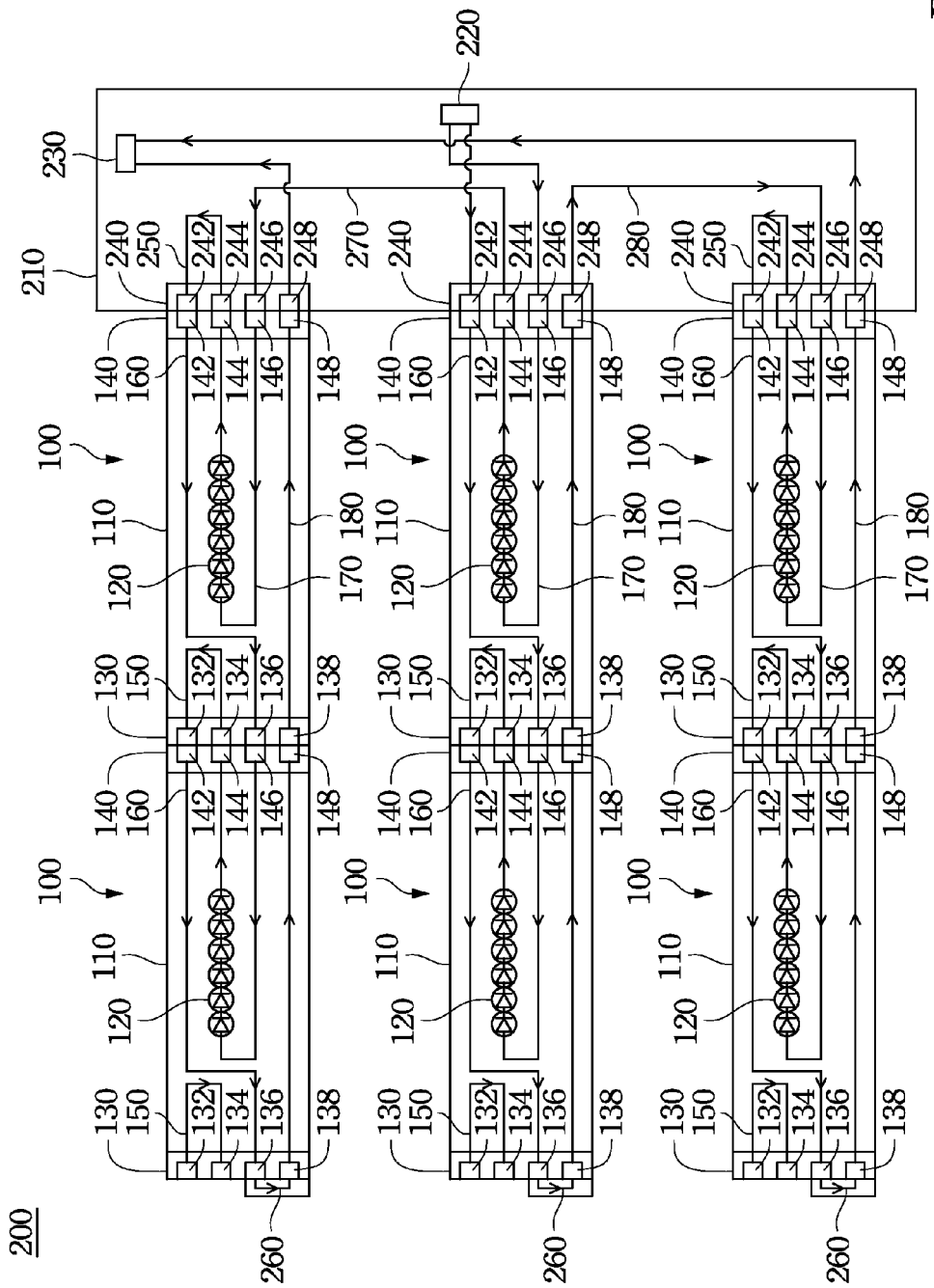
FIG. 7 is a schematic diagram of a sixth embodiment of the light emitting module of the invention.

FIG. 7 is a schematic diagram of a sixth embodiment of the light emitting module of the invention. Only the differences between this embodiment and the fifth embodiment will be described. The twelfth pin 248 of the third connector 240 connected to the first row of the light bars 100 is connected to the driving chip 230. The ninth pin 242 and the eleventh pin 246 of the third connector 240 connected to the second row of the light bars 100 are connected to the power source 220. The twelfth pin 248 of the third connector 240 connected to the third row of the light bars 100 is connected to the driving chip 230. The light emitting diodes 120 are serially connected from the seventh pin 146 to the sixth pin 144 of each of the light bars 100. The current path is shown by the arrows in FIG. 7.

According to above embodiments, users may flexibly assemble the light bars with substantially the same layout in rows, and the light bars in rows can be further interconnected so as to realize a light emitting module of a predetermined size. The light bars utilized in the light emitting module have substantially the same layout. Therefore, the cost of managing the light bars can be reduced, and assembly can be performed more easily.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light bar comprising:
   a substrate;
   a plurality of light emitting diodes disposed on the substrate;
   a first connector disposed at a first end of the substrate, the first connector comprising:
      a first pin, at a top of said first end;
      a second pin, adjacent to said first pin;
      a third pin, adjacent to said second pin; and
      a fourth pin, at a bottom of said first end adjacent to said third pin;
   a second connector disposed at a second end of the substrate opposite to the first connector, the second connector comprising:
      a fifth pin, at a top of said second end;
      a sixth pin, adjacent to said fifth pin;
      a seventh pin, adjacent to said sixth pin; and
      an eighth pin, at a bottom of said second end adjacent to said seventh pin;
   a first wire connecting the first pin to the second pin;
   a second wire connecting the third pin to the fifth pin;
   a third wire connecting the sixth pin to the seventh pin and serially connecting the plurality of light emitting diodes, wherein all of the plurality of light emitting diodes on the substrate are connected in series between the sixth pin and the seventh pin; and
   a fourth wire connecting the fourth pin to the eighth pin.

2. The light bar of claim 1, wherein the first wire and the third wire are U-shaped, and the fourth wire is linearly arranged.

3. The light bar of claim 2, wherein the second wire is step-shaped and partly surrounds the plurality of light emitting diodes.

4. The light bar of claim 1, wherein an anode of each of all of the pluralities of light emitting diodes is electrically connected to the sixth pin, and a cathode of each of all of the pluralities of light emitting diodes is electrically connected to the seventh pin.

5. The light bar of claim 1, wherein an anode of each of all of the pluralities of light emitting diodes is electrically connected to the seventh pin, and a cathode of each of all of the pluralities of light emitting diodes is electrically connected to the sixth pin.

6. A light emitting module comprising:
   a plurality of the light bars of claim 1, wherein the second connector of each of the light bars is connected to the first connector of the adjacent light bar.

7. The light emitting module of claim 6, further comprising an adopting board, and a third connector disposed on the adopting board, wherein the third connector is connected to the second connector of the light bar adjacent to the adopting board.

8. The light emitting module of claim 7, wherein the third connector sequentially comprises a ninth pin, a tenth pin, an eleventh pin, and a twelfth pin, the light emitting module further comprising a fifth wire for connecting the ninth pin to the tenth pin.

9. The light emitting module of claim 8, further comprising a power source, wherein the eleventh pin or the twelfth pin is connected to the power source.

10. The light emitting module of claim 8, further comprising a driving chip, wherein the twelfth pin or the eleventh pin is connected to the driving chip.

11. The light emitting module of claim 6, further comprising a conductive element for electrically interconnecting the third pin and the fourth pin of the first connector of the light bar farthest from the adopting board.

12. The light emitting module of claim 11, wherein the conductive element is a jumper, a pad, a wire, or a connector.

13. The light emitting module of claim 6, wherein the first pin, the second pin, the third pin, and the fourth pin are sequentially arranged.

14. The light emitting module of claim 6, wherein the fifth pin, the sixth pin, the seventh pin, and the eighth pin are sequentially arranged.

* * * * *